United States Patent
Rhodes

(10) Patent No.: US 10,116,527 B2
(45) Date of Patent: Oct. 30, 2018

(54) METHODS AND APPARATUSES FOR VALIDATING NETWORK PACKET BROKERS

(71) Applicant: Ixia, Calabasas, CA (US)

(72) Inventor: Elaine Rhodes, Santa Clara, CA (US)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 212 days.

(21) Appl. No.: 14/475,511

(22) Filed: Sep. 2, 2014

(65) Prior Publication Data

US 2017/0041199 A1 Feb. 9, 2017

(51) Int. Cl.
| G06F 15/173 | (2006.01) |
| H04L 12/26 | (2006.01) |
| H04L 12/24 | (2006.01) |
| G06F 3/0482 | (2013.01) |
| G06F 3/0481 | (2013.01) |

(52) U.S. Cl.
CPC .......... *H04L 43/028* (2013.01); *G06F 3/0482* (2013.01); *H04L 41/20* (2013.01); *H04L 41/22* (2013.01); *H04L 43/12* (2013.01); *H04L 43/18* (2013.01); *H04L 43/50* (2013.01); *G06F 3/04817* (2013.01)

(58) Field of Classification Search
CPC ......... H04L 41/22; H04L 41/20; H04L 43/18; H04L 43/028; G06F 3/0482
See application file for complete search history.

(56) References Cited

U.S. PATENT DOCUMENTS

| 8,248,928 B1 | 8/2012 | Wang et al. |
| 9,806,907 B2 | 10/2017 | Nachum |
| 2002/0049841 A1 | 4/2002 | Johnson et al. |
| 2002/0097733 A1 | 7/2002 | Yamamoto |
| 2003/0135612 A1* | 7/2003 | Huntington ......... H04L 12/2602 709/224 |
| 2007/0041364 A1 | 2/2007 | Kakadia |
| 2007/0230486 A1* | 10/2007 | Zafirov .................. H04L 43/12 370/401 |
| 2009/0290501 A1* | 11/2009 | Levy ....................... H04L 49/70 370/250 |
| 2011/0202696 A1 | 8/2011 | Kitahara |
| 2012/0058777 A1 | 3/2012 | Nguyen et al. |
| 2013/0227689 A1* | 8/2013 | Pietrowicz ............... G01R 1/20 726/23 |
| 2013/0250777 A1 | 9/2013 | Ziegler |

(Continued)

OTHER PUBLICATIONS

Non-Final Office Action for U.S. Appl. No. 14/266,666 (dated Aug. 19, 2016).

(Continued)

*Primary Examiner* — Richard G Keehn

(57) ABSTRACT

A method for validating a network packet broker is disclosed. The method includes configuring in software at least one of a on filter and a load balancer, processing a packet capture file containing data packets using the at least one filter and the load balancer such that data packets processed is output from an output port of the network packet broker. The method also includes analyzing, using a protocol analyzer, the data packets output by the output port of the network packet broker to validate the network packet broker.

19 Claims, 2 Drawing Sheets

(56) References Cited

U.S. PATENT DOCUMENTS

2013/0347103 A1* 12/2013 Veteikis ................ H04L 43/04
726/22
2014/0171089 A1* 6/2014 Janakiraman ....... H04L 63/0892
455/445
2015/0319098 A1 11/2015 Nachum

OTHER PUBLICATIONS

Application Initiated Interview Summary for U.S. Appl. No. 14/266,266 (dated Apr. 28, 2016).
Final Office Action for U.S. Appl. No. 14/266,666 (dated Feb. 22, 2016).
"Network Taps," Net Optics, Inc., p. 1-5 http://web.archive.org/web/20130202072753/http://www.netoptics.com/products/networktaps? (Jan. 27, 2016).
Non-Final Office Action for U.S. Appl. No. 14/266,666 (dated Sep. 15, 2015).
"What is a Wifi Network Analyzer," Wireshark, https://web.archive.org/web/20140801025323/http://wireshark.com/, p. 1-3 (Aug. 1, 2014).
Notice of Allowance and Fee(s) Due & Examiner-Initiated Interview Summary for U.S. Appl. No. 14/266,666 (dated Mar. 10, 2017).
Notice of Allowance and Fee(s) Due for U.S. Appl. No. 14/266,666 (dated Jul. 12, 2017).
"Ostinato Network Traffic Generator and Analyzer," Ostinato Corporation, https://code.google.com/p/ostinato/, pp. 1-5 (Oct. 24, 2016).

* cited by examiner

METHODS AND APPARATUSES FOR VALIDATING NETWORK PACKET BROKERS

BACKGROUND OF THE INVENTION

Network packet brokers (NPBs) have long been employed to facilitate processing of data packets and/or to route data packets to desired destinations. In an example application, NPBs may be employed IO mirror and/or route traffic to monitoring tools. These monitoring tools may include, for example, network analysis tools, forensic tools, various network monitoring tools, firewalls, malware prevention tools, intrusion detection tools, etc.

In an example, NPBs represent hardware and/or software modules that perform, among other tasks, aggregation of monitored traffic (which may be the original data packets or replicated copies thereof) from multiple links/segments, filtering and grooming of traffic to relieve overburdened monitoring tools, load-balancing traffic across a pool of monitoring tools, and regeneration of traffic to multiple monitoring tools. NPBs are available from vendors such as Ixia Corporation of Calabasas, Calif.

FIG. 1 illustrates a typical NPB application, which receives traffic from the network conceptually represented by a combination of router 102, switch or tap 104 and switch 106. Switch or tap 104 represents the device to copy or redirect traffic traversing router 102 and switch 106 to input port 108 of NPB 130. In the example of FIG. 1, the destinations for NPB traffic may represent, without limitation, network testing, monitoring, and analysis tools. These are shown as test tools 122, 124, 126, and 128 of FIG. 1.

The operator, typically a network engineer or network administrator and not shown explicitly in FIG. 1, configures fitters (such as 110) and load balancers (such as 112) of the NPB (130) to select the traffic received via one or more input ports 108 in order to direct the selected traffic to particular destinations (e.g., either one or more of tools 122, 124, 126, and 128 via ports 114, 116, 118 and 120).

Generally speaking, filters (such as 110) select traffic based on various criteria, including for example, specific IP addresses or specific protocols designated in a traffic packet's header portion and send those packets to a specific destination (port). The ports are shown as ports 114, 116, 118 or 120 in FIG. 1.

Load balancers (such as 112) tend have the additional or alternative function of distributing selected packets over a number of destinations, usually with the goal of sending an equal number of packets to each destination or in accordance with some weighting methodology. For example, if a load balancer selects 100 packets and has 4 destinations, the goal of a load balancer aiming to distribute the packets evenly among the four destinations would be to send 25 of the selected packets to each port.

When deploying an NPB solution, operators must develop the appropriate filters and load balancers, which may be simple or highly complex. To ensure proper operation, operators need to validate the accuracy of the filters and load balancers before these filters and load balancers may be deployed in a production environment. This is because incorrect filters or load balancers may have mild to severe negative impacts on network traffic, and thus on the critical business applications which rely on accurately processed network traffic, and thus on the business itself.

In the prior art, filter and load balancer validation of a NPB has typically been accomplished by configuring hardware test equipment and the NPB in a lab environment. FIG. 2 illustrates a typical NPB validation environment. A traffic generator 206 is typically used to send traffic into the NPB input ports (represented by input port 204) of NPB 210, and a protocol analyzer 216 is used to capture the traffic from the NPB output ports (represented by one or more of output ports 214, 218, 220 and/or 222). The traffic generator 206 and protocol analyzer functions 216 may be included in a single tool or "box" or in different tools or boxes.

Alternately, the traffic generator 206 could be a tap or span port from a live network, but typically NOT the production network during testing because of the need to isolate the production network from the test environment to prevent any possible business disruption.

Alternately, the protocol analyzer 216 could be a copy of the actual test tool that will be used in the production environment.

In an example, the protocol analyzer could be a software tool such as the open source product Wireshark (www.wireshark.org) executing on a standard personal computer such as a desktop or laptop computer although this approach normally suffers from poor performance for the hardware testing environment of FIG. 2.

The NPB filters (such as 208) and load balancers (such as 212) are then validated by (1) configuring the filters and load balancers and other set-up requirements in the NPB, (2) creating traffic using the traffic generator to cause the traffic to enter the input port of the NPB, (3) capturing the traffic with the protocol analyzer, and (4) manually examining the captured traffic to determine if the filters and load balancers produced the desired result.

However, this approach suffers many disadvantages. For example, it is necessary to procure and configure the traffic generator, NPB, and protocol analyzer. The procurement of these devices may be expensive. This is because traffic generators, NPBs, and protocol analyzers are typically expensive pieces of equipment, typically costing tens or hundreds of thousands of dollars.

Therefore a large investment is often required to validate the NPBs in the prior art. Due to the large investment required, these equipment tend to be a limited resource in any given enterprise such that time spent using the equipment may be costly and on short allocation, potentially delaying filter and load balancer validation and thus NPB deployment.

Further, the configuration tasks may be complex and time-consuming, and require expert skills. Such expert skills tend to be in short supply in any given enterprise, as may be expected.

Additionally, the validation turn-around time is significant using the prior art approach and directly affects the overall time it takes to validate the filters and load balancers. For example, test validation may require multiple cycles of changing filters and load balancers, modifying configurations of the filters and load balancers, programming the traffic generator for new traffic, and moving cables to different ports on the NPB, etc. Some of these tasks may require the validation testers to physically move from in front of the computer console (where testing is run) to the equipment room where the hardware is implemented to make changes. These multiple cycles are typically necessary to, for example, debug the implementation of the filters and/or load balancers, to test their performance using different types of traffic and different traffic loads, to verify their performance using different tests, etc. The complexity of these tasks and the time-consuming steps required during each test cycle increase the overall time it takes to complete the validation test.

Decreasing the complexity of the test environment, reducing the need for expensive equipment, and/or speeding up the test iteration turn-around time in order to speed up NPB validation and thus speeding up NPB deployment are some of the goals of various embodiments of the present invention.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
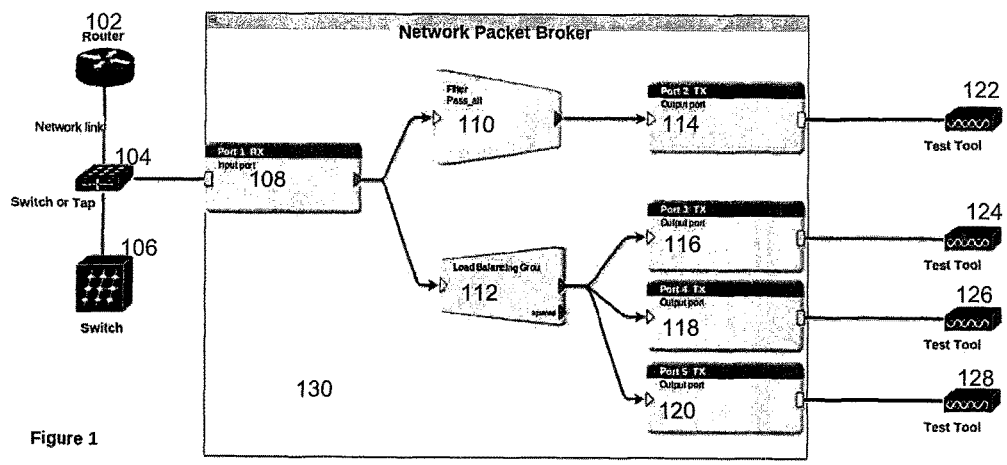
FIG. 1 illustrates a typical NPB application to facilitate discussion.
Figure 2:
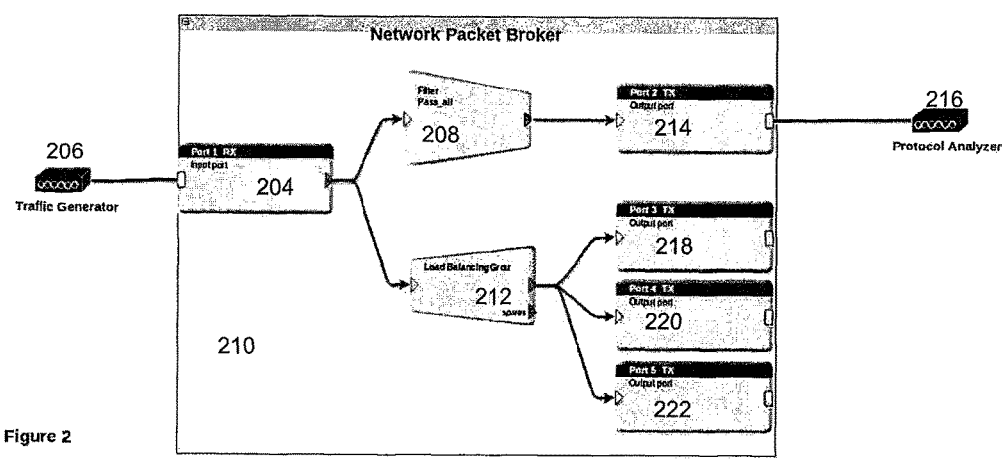
FIG. 2 shows an example prior art NPB validation arrangement to facilitate discussion.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for staring computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Embodiments of the invention relate to methods and apparatus for validating NPBs using a software-implemented approach. Unlike the prior art approach in which a hardware NPB is required and in which time-consuming reconfiguration needs to be performed on the hardware NPB during various test cycles of the validation project, the software implemented approach employs off-the-shelf software protocol analyzer to test software-implemented NPBs on off-the-shelf computers (such as widely available desktops or laptop computers).

In an embodiment, a user interface panel is provided to enable the operator to select an input file containing the data emulating the incoming network traffic. Furthermore, the user interface panel also enables entry of configuration parameters to configure the filters and load balancers of the NPB. Further, the user interface panel also enables the selection of the NPB input port and the NPB output port in order to inform the software protocol analyzer of the software-implemented NPB input port to apply the incoming network traffic data file as well as of the software-implemented NPB output port to monitor.

In an embodiment, the filter logic of the software protocol analyzer is used to model the underlying filter. Modeling the underlying load balancer is accomplished by modeling a filter for each of the input and output port(s) of the load balancer. For example, if the load balancer is to load balance traffic received at one input port of the load balancer to two output ports of that load balancers, these three input and output ports of the load balancer may be implemented by three filters, for example.

Alternatively or additionally, the underlying filter and load balancer may be modeled using software modules external to the software protocol analyzer. In this case, the software protocol analyzer is employed only to apply the incoming network data file to the specified input port of the software-implemented NPB and to monitor the output port(s) of the software-implemented NPB, with the underlying filters and load balancers implemented using software modules external to the software protocol analyzer. In this embodiment, the operator may be provided with the option to invoke a user-input field(s) in one or more user input panel(s) to enable the specification (such as file path) of software module(s) used to implement the filters and/or load balancers.

Figure 3:
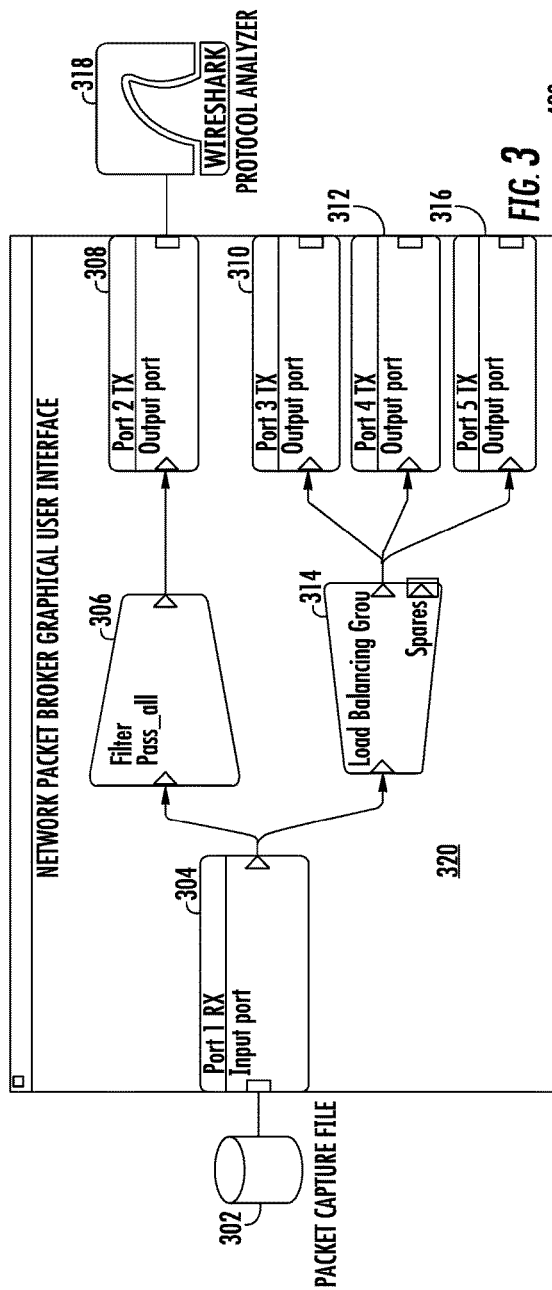
FIG. 3 shows, in accordance with an embodiment of the invention, a software implemented NPB validation arrangement.

The features arid advantages of embodiments of the present invention may be better understood with reference to the figures and discussions that follow. FIG. 3 shows, in accordance with an embodiment, the software-implemented NPB validation environment it should be noted that all of the blocks in FIG. 3 may be implemented via software, some or preferably all of which may be executing on the desktop (or laptop) PC of the operator.

Packet Capture File (PCF) 302 is a software file that contains a representation of the network traffic that arrives at the input port of the NPB 320, which itself is a software construct. In one or more embodiments, this PCF file 302 is in the industry-standard "pcap" format. The operator may have many Packet Capture Files representing different traffic streams that may be used in different cycles of the filter and load balancer validation.

The traffic in a Packet Capture File 302 may be generated by recording such traffic from a network link or traffic generator. The recording may be performed using a protocol analyzer such as Wireshark. Alternatively, data in the PCF 302 may be generated using a software traffic generator such as one made by Ostinato Corporation (https://code.google.com/p/ostinato/).

Note that the Packet Capture Files need to be generated only once and may be used over and over for subsequent testing. Thus, if a PCF 302 is generated using hardware such as an actual hardware traffic generator, the hardware traffic generator is not required again with every new test cycle, thus freeing up the expensive hardware traffic generator for other tasks.

The data in PCF 302 may contain traffic captured from the production network. Thus validation of filters and load balancers of the NPB may be performed on data from the production network without any risk to the production network itself.

Graphical User Interface (UI) 320 represents the graphical interface employed to configure the NPB. In fact, FIG. 3 represents what the operator actually sees on the screen in an embodiment of a user interface in which the operator may use a mouse to specify a connection between PCF 302 and the input port 304. Once the operator draws this connection, the user interface logic interprets this operator-designated graphical connection as the application of PCF 302 to a specific input port of the software-implemented NPB during validation. Similarly, the operator may designate the connections between input port 304 and the input port of filter 306 and the input port of load balancer 314 (one or preferably both filter 306 and load balancer 314 are software constructs in accordance with one or more embodiments of the present invention).

Similarly, the operator may designate the connection between the output port of filter 306 and port 308 of the software-modeled NPB using the aforementioned graphical approach. Similar designation may be performed to specify the connections between the output port of load balancer 314 and each of ports 310, 312, and 316 of the software-modeled NPB. Likewise, the operator may designate the connection between the output port 308 of the software-modeled NPB and the input on of protocol analyzer 318 to enable protocol analyzer 318 (which itself is a software construct) to analyze the traffic coming out of NPB port 308.

In an embodiment, a single instantiation of the protocol analyzer 318 may be used to monitor each of ports 308, 310, 312, and 316. In another embodiment, different instantiations of protocol analyzer 318 may be used to monitor ports 308, 310, 312, and 316, with each instantiation monitoring one or more of ports 308, 310, 312, and 316.

As may be appreciated from the foregoing, user interface 320 represents the facility with which the operator may configure and monitor the software-modeled NPB. UI 320 may be accessed, in one or more embodiments, through a Web browser such as Microsoft Internet Explorer (available from Microsoft Corporation of Redmond, Wash.), or UI 320 may be a stand-alone software application such as a Java application. In one or more embodiments, UI 320 may be integrated within the NPB's UI. Alternately, UI 320 could be a different software application, such as for example a stand-alone application that emulates the NPB UI Protocol analyzer 318 may be implemented by an off-the-shelf protocol analyzer such as the aforementioned Wireshark product.

In an embodiment of the invention, NPB validation may be accomplished via the following steps. Initially, the operator may configure the filters and load balancers for the NPB, using a user interface such as one shown in block 320 of FIG. 3. This configuration specifies the overall configuration of the NPB as discussed in connection with FIG. 3.

The operator may also click (or double click) on filter block 306 in graphical user interface 320 to bring up a UI panel (not shown) to specify the filter parameters (such as which protocol to monitor, traffic from which port, etc.). Similarly, the operator may also click (or double click) on load balancer block 314 in graphical user interface 320 to bring up a UI panel (not shown) to specify the load balancer parameters (such as which protocol to monitor, traffic from which port, how many output ports to distribute the load, whether the load will be distributed evenly among the output port or whether the load would be distributed in accordance with some specific predefined approach, etc.). Note that the configuration data (i.e., those for the overall NPB and for each of the filters and/or load balancers) does not need to be loaded into the NPB hardware device since hardware NPB is not employed for validation in one or more embodiments of the invention.

Figure 4:
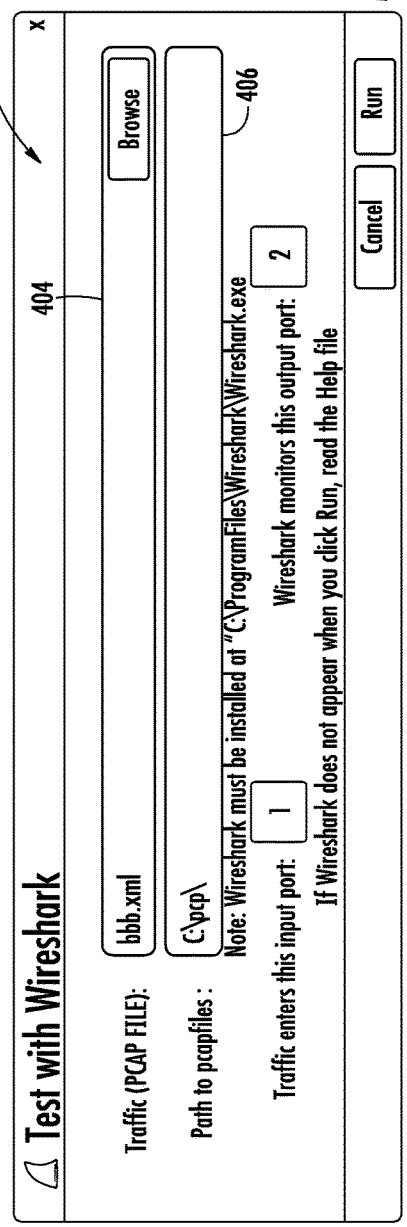
FIG. 4 shows, in accordance with an embodiment of the invention, a user interface for specifying the input file and ports for use in the software-implemented NPB validation.

Subsequently, the operator may specify the desired Packet Capture File (PCF) from the operator's computer; and also to designate the input port(s) and output port(s) for the test. An example of such a dialog box 420 is shown in FIG. 4. In FIG. 4, the user may enter the name (404) and path (406) of the PCF file. In an embodiment, if the operator already configures the overall NPB using the graphical UI 320 of FIG. 3, the input port (1) and the output port (2) are already filled in when UI 420 is invoked. Alternatively, the operator may manually enter these ports.

When the operator presses the button "Run", logic underlying UI 420 causes the protocol analyzer, which has been previously installed on the operator's computer, to begin running. The protocol analyzer may automatically display the packets from the Packet Capture File. These packets are processed by logic implemented the filter(s) and load balancer(s), the configuration of which has been specified by the operator as discussed earlier. The output of these filters and load balancers may be examined at the NPB output ports (e.g., one or more of ports 308, 310, 312, and 316) by the protocol analyzer software, and the result may be displayed to the operator.

In this manner, the operator may examine the packets using all of the protocol analyzer's facilities, exactly as if the packets had been collected in the hardware environment. The operator may also be able to use a "statistics" facility in the protocol analyzer to examine the distribution that a load balancer would generate across the set of output ports, such as 30%, 25%, 25%, 20% for a 4-port load balancer.

In a specific example embodiment, after the operator invokes UI 420 and selects the Packet Capture File, input port, and output port, the validation software of one or more embodiments of the invention (hereafter, "the validation software") executes an algorithm to determine the paths that traffic packets may follow to travel from the input port to the output port.

The algorithm also determines all of the filtering and load balancing configurations along the path. This algorithm may be identical or similar to algorithms the UI also uses to convert the operator's filters and load balancers into configuration data when it loads the configuration into the NPB hardware device. In other words, the algorithm may not need to be developed exclusively for implementing embodiments of the invention.

The validation software may interpret the result of the algorithm and translates or converts them into the equivalent filter of the protocol analyzer, which is likely in a different syntax and factoring than the output of the algorithm. As mentioned, the underlying filters and/or load balancers may be modeled using logic provided with the protocol analyzer such as Wireshark) or using software code external to the protocol analyzer.

The validation software may then invoke the protocol analyzer program with a command line. The command line may include the Packet Capture File and the equivalent filter and/or load balancer so that the protocol analyzer may automatically load the Packet Capture File and applies the equivalent filter and/or load balancer.

For example, the command line may read:
wireshark -r C:\pcap\http.cap -R. "ip.proto==6"

where "wireshark" is the name of the protocol analyzer program, "C:\pcap\http.cap" is the name of the Packet Capture File, and "ip.proto==6" is the equivalent filter.

The command line may include other parameters such as how many output ports a load balancer has and which packet header fields should be used to determine the load balancer distribution (i.e., the load balancer "hash" fields). The validation software may use a variety of mechanisms to invoke the protocol analyzer program. For example, if the UI is accessed through the Microsoft Internet Explorer Web browser, a mechanism known as an "ActiveX control" may be used. Mechanisms to invoke an application are known to practitioners in the UI field and will not be further elaborated here.

In one or more embodiments, a custom software module, such as a plugin, may be implemented display load balancer distribution statistics or other useful statistics. These custom software modules may expand the functionality of the protocol analyzer, if the protocol analyzer supports such custom software modules. In the case where the aforementioned Wireshark product is used for implementing the protocol analyzer, a custom Wireshark "dissector" is used to add the capability of analyzing and displaying the load balance distribution out of each load-distributed port. Wireshark's plugin support allows the dissector to add an entry (load balance statistics) to the protocol analyzer's Statistics menu such that the operator may view the results, i.e., the load balance distribution.

In a particularly advantageous embodiment, the software-implemented NPB validation approach is employed as a preliminary validation step prior to actual hardware validation. In other words, this embodiment does not seek to completely replace filter and load balancer validation using hardware equipment. This is because the inventor(s) herein realize that there are inherent limitations to any software modeling approach. Thus although the software modeling approach as discussed in one or more embodiments above may be employed to greatly reduce (due to the ability of software to rapidly test different input data sets and with different configuration parameters) the amount of hardware testing and to detect and correct for obvious errors in NPB implementation, it may be desirable to also implement hardware testing (in the manner discussed in connection with prior art NPB validation) following software validation prior to actual use to eliminate errors introduced by the software models themselves.

As may be appreciated from the foregoing, embodiments of the invention enable NPB filters and load balancers to be validated quickly and directly from the NPB UI (such as those shown in FIG. 3 and FIG. 4) without involving hardware devices as was done in the prior art. By reducing of eliminating hardware testing, embodiments of the invention enable faster filter and load balancer validation and reduce the need for possibly scarce hardware testing equipment.

Further, embodiments of the invention reduce the cost of NPB-based projects because they reduce the amount of time required to test using expensive testing equipment as well as reduce or eliminates the need for validation expertise. Test iteration time is greatly reduced because changing the test input is simply a matter of selecting a different Packet Capture file; changing the filters and load balancers is done in the NPB UI without needing to load the changes into the physical device; and different NPB input and output ports are selected with simple mouse clicks rather than having to move cables. Due to the ability to iterate tests quickly and painlessly via software, testing is likely to be more thorough, decreasing the risk to the business when the solution is deployed.

Additionally, embodiments of the invention employ methodology and/or software that the operator is likely to already be familiar with, namely, the NPB UI and the protocol analyzer such as the proven Wireshark. Thus the learning curve is quite low with embodiments of the invention. If logic in the protocol analyzer is also employed to implement the underlying filters and load balancers, risk is further reduced since this logic is likely already well-tested over time. If the protocol analyzer is open source software, ease of customization and community-based improvement are additional advantages that further improve the reliability and expand the capability of the software NPB validation approach.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also he noted that there are many alternative ways of implementing the methods and apparatuses of the present invention. It is therefore intended that the following appended claims be interpreted as including all such alterations, permutations, and equivalents as fall within the true spirit and scope of the present invention.

The invention claimed is:

1. A method for validating a network packet broker, comprising:
   providing a software model of a network packet broker including a modeled filter and a modeled load balancer;
   using filter logic of a software protocol analyzer to implement said modeled filler:
   using said software protocol analyzer to implement said modeled load balancer;
   providing a packet capture file, said packet capture file containing data packets captured from a production network or generated by a traffic generator;
   creating a first association between an input port of said software model of said network packet broker and said packet capture file;
   creating a second association between said input port and at least one of an input port of said modeled filter of said software model of said network packet broker and an input port of said modeled load balancer of said software model of said network packet broker;
   creating a third association between said at least one of said input port of said modeled filter and said input port of said modeled load balancer with an output port of said software model of said network packet broker;
   creating a fourth association between said output port of said software model of said network packet broker and said software protocol analyzer, thereby designating data packets output from said output port of said software model of said network packet broker be received by said software protocol analyzer for analysis; and invoking said software protocol analyzer to transmit said data packets from said packet capture file through said modeled filter implemented by said software protocol analyzer and said modeled load balancer implemented by said software protocol analyzer to validate said modeled filter and said modeled load balancer.

2. The method of claim 1 wherein said creating said first association is performed using a screen-based text-based user interface.

3. The method of claim 1 wherein data packets in said packet capture file represents previously captured packets of network traffic traversing a production network.

4. The method of claim 1 wherein at least one of said modeled filter and said modeled load balancer is a software construct.

5. The method of claim 1 wherein said at least one of said input port of said modeled filter and said input port of said modeled load balancer is a software construct implemented using said filter logic provided by said software protocol analyzer.

6. The method of claim 1 wherein said creating said first association is performed using a screen-based graphical UI interface.

7. The method of claim 6 further comprising configuring said at least one of said input port of said modeled filter and said input port of said modeled load balancer by at least selecting said at least one of said input port of said modeled filter and said input port of said modeled load balancer through said screen-based graphical user interface.

8. A method for validating a network packet broker, comprising:

providing a software model of a network packet broker including a modeled filter and a modeled load balancer;

using filter logic of a software protocol analyzer to implement said modeled filler;

using said software protocol analyzer to implement said modeled load balancer;

configuring, in said software model of said network packet broker, said modeled filter;

providing a packet capture file, said packet capture file containing data packets captured from a production network or generated by a traffic generator;

invoking said software protocol analyzer to transmit data packets from said packet capture file through said modeled filter implemented by said software protocol analyzer to validate said modeled filter;

processing said data packets from said packet capture file using said modeled filter such that data packets processed by said modeled filter are output from an output port of said software model of said network packet broker;

transmitting said data packets processed by said modeled filter from said output port of said software model of said network packet broker to said protocol analyzer;

analyzing, using said protocol analyzer, said data packets output by said output port of said software model of said network packet broker to validate said modeled filter.

9. The method of claim 8 wherein further comprising designating said packet capture file as input to said software model of said network packet broker is performed using a screen-based text-based user interface.

10. The method of claim 8 wherein said data packets in said packet capture file represents previously captured packets of network traffic traversing a network.

11. The method of claim 8 wherein said modeled filter is a software construct.

12. The method of claim 8 wherein further comprising designating said packet capture file as input to said network packet broker is performed using a screen-based graphical UI interface.

13. The method of claim 12 further comprising configuring said modeled filter by at least selecting said modeled filter through said screen-based graphical user interface.

14. A method for validating a network packet broker, comprising:

providing a software model of a network packet broker including a modeled filter and a modeled load balancer;

using filter logic of a software protocol analyzer to implement said modeled filler;

using said software protocol analyzer to implement said modeled load balancer;

configuring, in said software model of said network packet broker, said modeled load balancer;

providing a packet capture file, said packet capture file containing data packets captured from a production network or generated by a traffic generator;

invoking said software protocol analyzer to transmit data packets from said packet capture file through said modeled filter implemented by said software protocol analyzer to validate said modeled filter;

processing said data packets from said packet capture file using said modeled load balancer such that data packets processed by said modeled load balancer are output from at least one output port of said software model of said network packet broker;

transmitting said data packets processed by said modeled filter from said output port of said software model of said network packet broker to said protocol analyzer; and analyzing, using said protocol analyzer, said data packets output by said at least one output port of said software model of said network packet broker to validate said modeled load balancer.

15. The method of claim 14 further comprising designating said packet capture file as input to said software model of said network packet broker is performed using a screen-based text-based user interface.

16. The method of claim 14 wherein said data packets in said packet capture file represent previously captured packets of network traffic traversing said production network.

17. The method of claim 14 wherein said modeled load balancer is a software construct.

18. The method of claim 14 wherein said modeled load balancer is a software construct implemented using logic provided by said protocol analyzer.

19. The method of claim 14 wherein further comprising designating said packet capture file as input to said software model of said network packet broker is performed using a screen-based graphical UI interface.

* * * * *